Dec. 16, 1958 W. T. HENTOSH 2,864,273
WRENCH FOR TURNING HEAVILY COATED FASTENERS
Filed Aug. 14, 1956
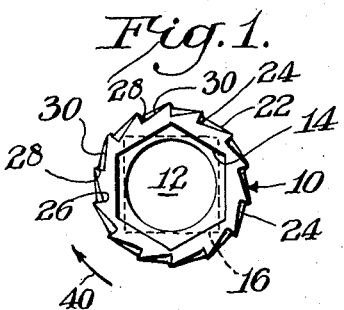
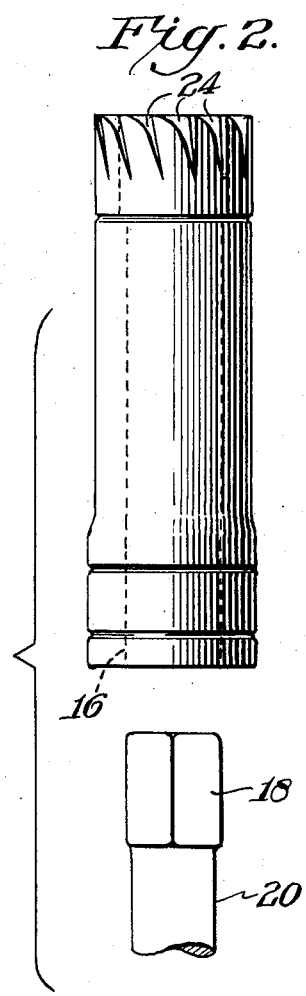
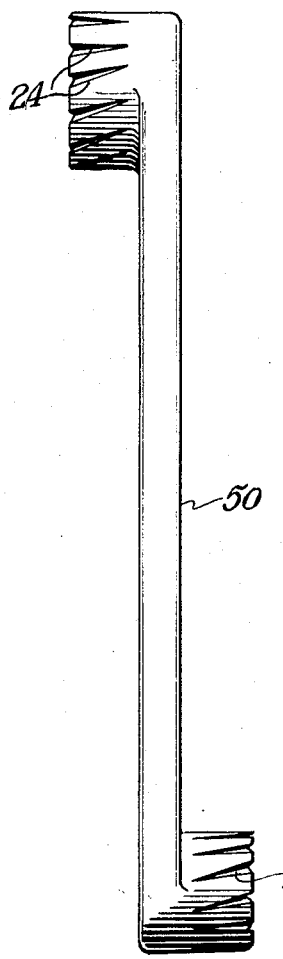
INVENTOR.
Wassil T. Hentosh
BY
Connolly and Hutz
ATTORNEYS

United States Patent Office 2,864,273
Patented Dec. 16, 1958

2,864,273

WRENCH FOR TURNING HEAVILY COATED FASTENERS

Wassil T. Hentosh, Elsmere, Del.

Application August 14, 1956, Serial No. 603,968

3 Claims. (Cl. 81—121)

This invention relates to tools, more particularly to tools for removing bolts, nuts and the like.

Among the objects of the present invention is the provision of novel tools for greater ease in removing bolts, nuts or similar members, when they are covered with coatings such as the thick plastic layers of asphalt applied to the under surfaces of automobile bodies and called "undercoating."

The above as well as additional objects of the present invention will be more clearly understood from the following description of several of its exemplifications, reference being made to the accompanying drawings wherein:

Fig. 1 is a plan view of a tool pursuant to the present invention;

Fig. 2 is a side view of the tool of Fig. 1, along with a broken-away portion of a cooperating driving member; and Fig. 3 is a side view of different form of tool illustrative of the invention.

According to the present invention a tool of the above kind has a socket with a mouth for slipping over and engaging the drive surfaces, the mouth having an outer wall, flutes in said outer wall, said flutes being portions of left-hand helixes, and the sockets being no greater than ¾ inch in overall width.

Best results are obtained with the above type of coatings, when the flutes extend only part way through the wall, and the distance from one flute to the next is between ⅛ and ½ inch.

It is desirable to have the socket at least about ¾ inch deep so as to provide sufficient space to receive heavy coatings without packing the coating down too tightly.

Referring now to the drawings, the tool of Fig. 1 is a generally cylindrical thick-walled length of tubing 10 having an internal passageway 12, that penetrates through its entire length. At one end the passageway is shaped in the form of a hexagonal mouth 14 so as to provide a driving socket that receives and closely engages a hexagonal nut or bolt head to be rotated by the tool. At its other end the opening is square in cross section as shown at 16 so that it receives and closely engages the driving end 18 of a driving member 20. Between its end, the opening can be of any desired shape or can even be partially or completely filled in or obstructed.

As illustrated, the mouth 14 has at its outer wall 22 a plurality of flutes or grooves 24 that preferably are equally spaced entirely around it. These flutes are more clearly shown in Fig. 2 as extending along the outer wall 22 at a small angle with respect to the longitudinal direction of tube 10, so that they are each small portions of left-hand helixes. By "left-hand" helixes is meant the types of helixes that correspond to left-hand male thread, that is an object moving along the helix groove from the engagement end travels in clockwise direction when it is observed from the axial direction toward which it moves. A pitch angle of about 1° to 85° can be used, but about 10 to 50° is preferred.

It is advantageous to have the flutes tapered in depth so that they extend a substantial depth into the outer wall 22 at the socket mouth, and are shallower at some distance from the mouth. For best results, the wall thickness beneath the groove bottoms at the mouth should be no more than about ¹⁄₃₂ inch, but this can be confined to only a very small transverse section of the groove, as shown at 26 for example. The remaining transverse portions can be inclined down to this depth to make two faces 28, 30. The face 28 on the side that follows behind the groove bottom 26 as the tool is rotated in counter-clockwise direction, is shown as more radially directed than the other face 28 in the construction of Fig. 1 so as to help plough out the coatings as the tool is rotated in the bolt- or nut-loosening direction. In Fig. 1, the tool is shown in a view looking at it from the end having the socket mouth, so that this direction, which is indicated by the arrow 40, appears to be reversed.

It is, however, not very important to effect this ploughing action. The faces 28, 30 can therefore be inclined in any other direction, if desired. They can also be spaced apart as by making the groove bottom 26 very much wider.

Inasmuch as the grooves tend to diminish the strength of the socket wall, they are desirably made of limited length and width. A total length of about ⅜ inch is quite adequate. Also the groove bottoms can taper to zero depth along this length, though they will also operate very well if deeper or even uniformly of maximum depths.

Also to keep from weakening the wall unduly, the individual grooves can be spaced so that the distance from one to the next is between ⅛ and ½ inch. At the mouth the grooves can be very wide so that one face 28 of one groove runs into the opposite face 30 of the adjacent groove. This width can be maintained over the entire groove length, but for added wall strength, the width is gradually diminished as shown in Fig. 2 for example.

When the tool of Figs. 1 and 2 is to loosen and remove a nut or bolt covered with as much as ¼ inch or more of undercoating, the tube 10 is first positioned so that its mouth is directly over the center of the little coating mound that identifies the location of the bolt head or nut. The mouth is then pressed into the mound with a little counter-clockwise rotation around its longitudinal axis. The mouth will readily penetrate the coating and the rotation will cause the hexagonal inner wall to move into a position that matches with the rotation position of the bolt head or nut. The tube then slips onto the head or nut, gouging up slivers of coating, along the flutes, as it seats itself. The driving member 20 is then engaged in the tube end 16, if this has not previously been done, and rotated until the bolt or nut is completely unthreaded. The tube 10 is then slipped off the bolt head or nut. The outside wall of the tube will then be found free of coating except for slivers that may adhere slightly within the grooves. These slivers, if any, are readily shaken off.

If the socket recess is made deep enough, at least about ¾ inch of unobstructed opening, it will also be found after the unthreading operation is completed, that the coating on the top of the bolt head or nut does not adhere to the inside of the tube. In other words, the tube will be substantially self-cleaning and no appreciable amount of coating will build up so as to require a special cleaning operation other than a shake or two as indicated above. The unobstructed opening is measured down to the level of the entering end 18 of drive member 20. Inasmuch as such driving ends are generally engaged about ¾ inch deep, the tube 10 preferably has an overall height of at least about 1½ inches.

The same tube 10 can then be used to restore the bolt or nut in place. In this operation, however, the flutes are of no particular value.

The flutes are preferably oriented oppositely to the thread of the bolt-head or nut that is to be removed. If oriented in the same direction, both right-handed, for example, the tube would have to be rotated in the tightening direction to cut through the coating until seated on the bolt-head or nut before the tool can be rotated in the loosening direction. This is a somewhat more awkward operation. Since practically all covered bolt heads and nuts have right-hand thread, the flutes 24 should accordingly be left-hand helixes.

Although driving member 20 is shown as having a square driving end 18, this end can be hexagonal or have any other type of non-circular cross section. It is clear however that the mating passageway end 16 should have a corresponding shape. Likewise, the socket 14 can be given any other non-circular shape that fiits the shape of the particlular component to be rotated. The socket can for example be of the 12-point type corresponding to the overall outline of two concentric identical hexagons lying in one plane but rotated 30° with respect to each other. This will fit hexagonal nuts or bolt heads in twelve different rotational positions rather than six positions that the tool of Fig. 1 will fit in. However, 12-point sockets are not as strong and also wear out more rapidly than 6-point (simple hexagon) ones.

Instead of having the tube 10 separate from its driving member 20, they can be made integral if desired.

Fig. 3 shows an integral modification of the invention in which the flutes 24 are applied to the outer wall of the engagement mouths of a box wrench 50. Here the tubular mouth ends need not be more than about ¾ inch deep, if completely penetrated by passageways.

One of the features of the present invention is the ease with which the fluted tube will find its way through the coatings to the bolt head or nut underneath. Since these coatings can be quite deep, it is preferred that the socket-carrying mouths be at least ½ inch deep so that they will not be entirely covered by the coatings to be encountered. This further simplifies the use of the tool since its location can then be more readily followed visually.

The above fluted construction is particularly desirable for bolt heads and nuts not over ¾ inch in width. Larger widths are conveniently located and loosened with plain or unfluted tools. The flutes are more helpful as the bolt heads or nuts get smaller in width. For example, a nut ¼ inch wide covered with undercoating is practically impossible to engage by a socket-like tool that does not have flutes. According to the prior art, it is necessary in these small sizes to first scrape the coating off the nut with a scraping tool. Such difficulties are completely eliminated by the tool of the present invention.

Many modifications and variations of the present invention are possible in the light of the above teachings. It is, therefore, to be understood that within the scope of the appended claims the invention may be practiced otherwise then as specifically described.

What is claimed is:

1. A tool for engaging and rotating drive members such as bolt heads and nuts that are equipped with right-handed thread, said tool having a socket with a mouth for slipping over and engaging the drive members, the mouth having an outer wall, flutes in said outer wall, said flutes being portions of left-hand helixes, and the sockets being no greater than ¾ inch in overall width.

2. The combination of claim 1 in which the distance from one flute to the next is between ⅛ and ½ inch.

3. The combination of claim 1 in which the socket is at least about ¾ inch deep, and the wall of the mouth, at the deepest portions of the flutes, is about 1/32 inch thick.

References Cited in the file of this patent

UNITED STATES PATENTS

| | | |
|---|---|---|
| 1,384,655 | Allman | July 12, 1921 |
| 1,537,929 | Lee | May 12, 1925 |
| 1,658,886 | Dickey | Feb. 14, 1928 |
| 2,568,788 | Bossen | Sept. 25, 1951 |
| 2,733,456 | Howell | Feb. 7, 1956 |